Figure 1:
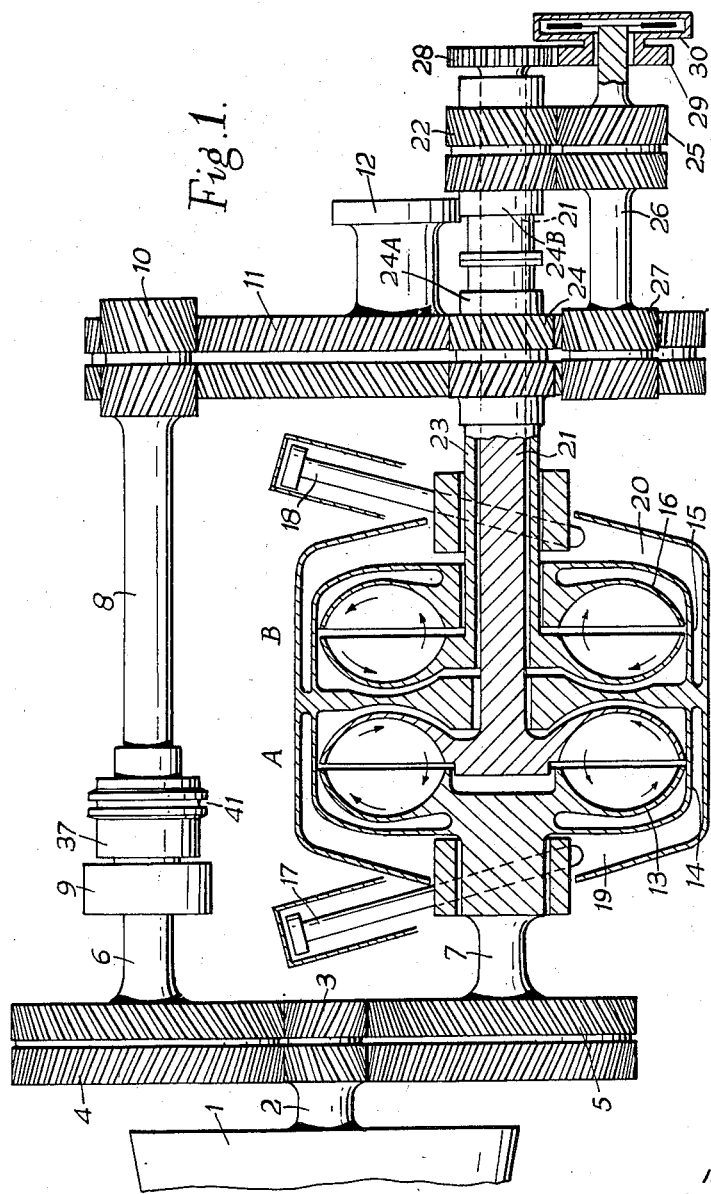

June 16, 1959      H. SINCLAIR      2,890,599
POWER TRANSMISSION MECHANISMS

Filed Dec. 7, 1954      2 Sheets-Sheet 1

INVENTOR
Harold Sinclair
BY
Benjamin Sweedler
ATTORNEY

June 16, 1959 H. SINCLAIR 2,890,599
POWER TRANSMISSION MECHANISMS
Filed Dec. 7, 1954 2 Sheets-Sheet 2

INVENTOR
Harold Sinclair
BY
Benjamin Sweedler
ATTORNEY

2,890,599
POWER TRANSMISSION MECHANISMS

Harold Sinclair, Windsor, England

Application December 7, 1954, Serial No. 473,634

Claims priority, application Great Britain
December 18, 1953

9 Claims. (Cl. 74—655)

This invention relates to geared power transmission mechanism specially suitable for driving loads having a centrifugal characteristic such as fans, pumps, and propellers. A well known form of double reduction gearing for the transmission of power between a driving member such as a turbine and a driven member such as a marine propeller is the so-called "locked train" in which the power delivered by the driving member is shared between two or more parallel power paths each of which consists of a mechanical train of gearing. For example, in a simple form of locked train reduction gear a pinion coupled to the output shaft of the high speed turbine engages with two gear wheels mounted respectively on parallel shafts each of which carries a pinion, the two pinions on the said shafts meshing with a gear wheel on the slow speed propeller shaft.

An advantage of such a locked gear train is that since the load is shared by the two power paths the pinions and gear wheels of each path can be relatively small as compared with the dimensions of these parts which would be required if the whole of the power were transmitted through a single path, and this leads to economy and compactness of the mechanism. A major disadvantage of a locked train however is that extremely high accuracy is required in the manufacture of the pinions and gear wheels and the supporting bearings and gear case to ensure that the two power paths will substantially share the load.

The object of the present invention is to provide a geared power transmission mechanism in which the power is transmitted via two or more paths in parallel and which avoids the foregoing major disadvantage of the locked gear train, and which has further advantages which will be referred to hereinafter.

According to the present invention there is provided a geared power transmission mechanism specially suitable for propeller drives, the mechanism comprising first and second parallel power paths between a driving member and a driven member, said first path providing mechanical drive and the second path including a slip coupling (which may be of controllable slip type) the ratios of the gearing being arranged so that the input shaft of the slip coupling rotates at a suitably higher speed than the output shaft of said coupling to provide for the slip that is necessary therein when transmitting the desired proportion of the power.

The slip coupling referred to above may be coupling of the hydraulic turbo type or a coupling of the electro magnetic type. By the term "controllable" is meant that the torque transmitting capacity of the coupling can be varied whilst the impeller of the coupling is rotating: in the case of a hydraulic turbo coupling the torque transmitting capacity may be controllable by means of an adjustable scoop tube which serves to vary the degree of filling of the working circuit of the coupling.

If desired a clutch may be included in the mechanical power path. By disengaging this clutch and employing only the power path in which the slip coupling is included when the system is working at reduced power, reduction in the speed of the propeller or other driven member can readily be obtained by increasing the degree of slip in the coupling, without necessarily altering the speed of the driving member below a desirable minimum speed.

Alternatively, by keeping the aforesaid clutch in engagement and by decreasing the torque transmitting capacity of the slip coupling to a suitable extent so as to render the path in which it is included substantially ineffective for the transmission of power, the mechanical path can be employed without slip loss therein, e.g., for driving the propeller at reduced speed by suitably reducing the power output of the driving member. In this manner the torque transmitted by and hence the slip loss in the controllable slip coupling (which operates with a predetermined slip of, say, 2% due to the ratios of the gearing) is reduced to a negligible amount.

The above-mentioned clutch may be a dog clutch, the presence of the slip coupling in the parallel power path enabling the dog clutch to be readily brought into a condition of speed and load for easy engagement and disengagement with appropriate regulation of the power being transmitted through the mechanism. Alternatively, the clutch may be a friction clutch, which may be of small size with high specific loading, since the presence of the slip coupling in the parallel power path will enable the friction clutch to be engaged and disengaged under a condition of substantially zero slip in the friction clutch. Preferably however, the foresaid clutch may be a clutch of the synchronising self-shifting type (S.S.S. clutch). In this case the presence of the slip coupling in the parallel power path enables the S.S.S. clutch to be brought readily into conditions of load and speed which are requisite for self-engagement and suitable for disengagement: if necessary with appropriate regulation of the power being transmitted through the mechanism.

To enable the mechanism to be employed at will also for providing forward and reverse drive, a reverse gear may be included in the power path in which the slip coupling is provided. In this case a clutch is essential in the parallel mechanical power path, the said clutch being disengaged when the reverse gear is to be set for providing reverse drive via the slip coupling. In a modification of this arrangement particularly suitable for gas turbine drives the slip coupling may be replaced by a pair of slip couplings which have their primary elements connected together, and which normally have their secondary elements coupled together but have their secondary elements coupled respectively to forward and reverse pinions of the reverse gear when the reverse gear is set for giving either forward or reverse drive.

In a further development of the invention there may be one or more additional power paths in parallel with those already mentioned, the said additional power paths including slip couplings which may be controllable slip couplings. That is to say, the mechanism according to the invention may incorporate one mechanical power path and two or more additional paths, each of which includes a slip coupling, or two slip couplings as above-described which may be of controllable type, in conjunction with reverse gearing.

Preferably when the prime mover is a gas turbine the slip couplings are of a type such that the torque transmission capacity thereof cannot be reduced when in operation below a minimum value which provides a minimum load on the prime mover. This expedient ensures that the prime mover, if a turbine, will not be fully unloaded and race when the mechanical path is disengaged and the power is transmitted by the slip couplings. Where the slip coupling is of the electromagnetic type it may incorporate means such as permanent magnet excitation which provide a minimum torque transmission capacity of the coupling. In the case of a hydraulic turbo coupling it may be constructed so that the working circuit is incapable of being emptied below a value which provides the desired minimum torque transmitting capacity.

An advantage of the mechanism according to the invention is that the slip loss in the path which includes the slip coupling or slip couplings represents only half of the total power transmitted, assuming that both paths, that is to say the mechnical path and the path having the slip coupling, are sharing the load equally. The normal slip in a hydraulic turbo coupling when operating at full speed with its working circuit filled may be about 2% and if the ratios of the gearing in the path in which the coupling is included are arranged so that the slip coupling is taking for example half the total power obviously the slip loss will be only 1% of the power delivered by the prime mover.

Figure 2:
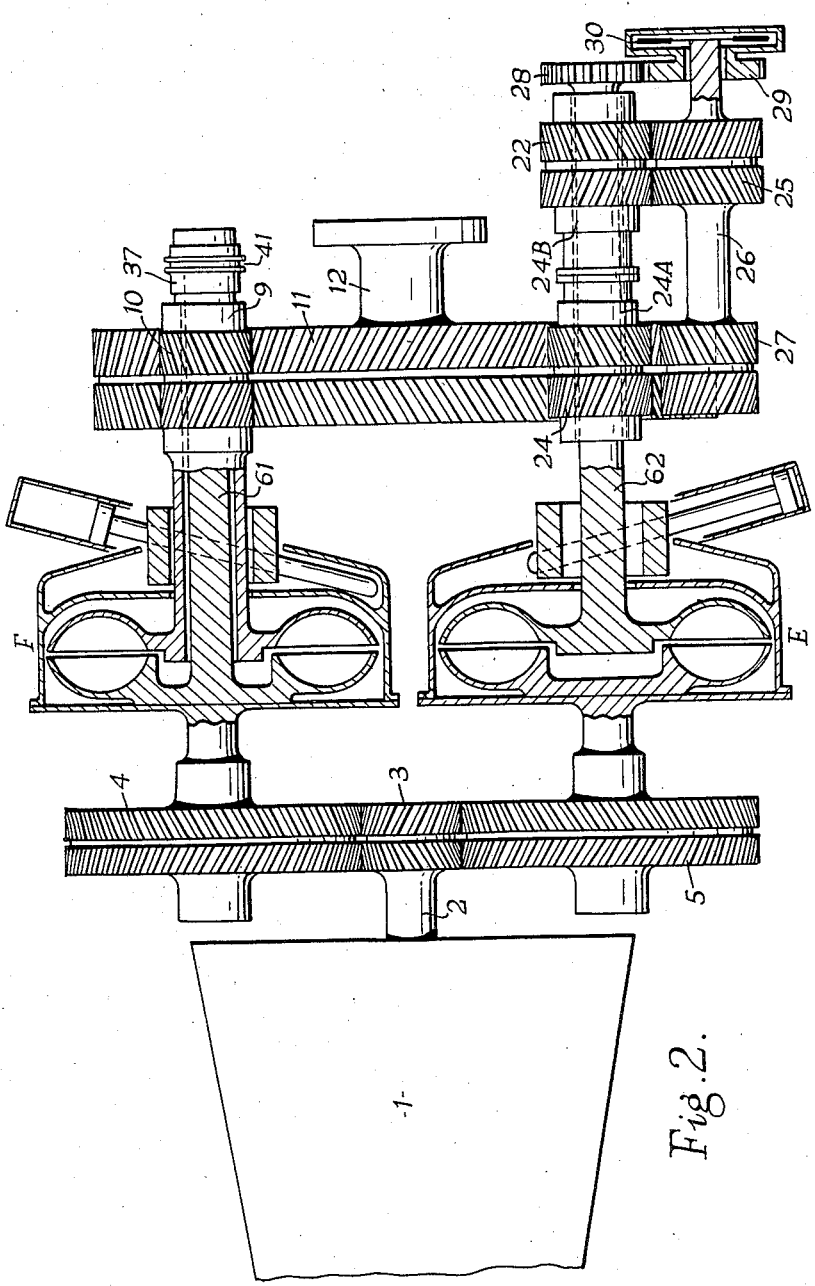

In order that the invention may be clearly understood and readily carried into effect, it will now be described in more detail with reference to the accompanying drawings, in which Figs. 1 and 2 are diagrammatic plan views of two forms of geared power transmission mechanism according to the invention.

The power transmission mechanism shown in Fig. 1 includes a prime mover 1, for example a turbine, on the output shaft 2 on which is fixed a pinion 3 meshes with gear wheels 4 and 5 which are fixed on shafts 6 and 7 respectively. For the sake of clearness the journals of the various shafts have been omitted from Figs. 1 and 2. The shaft 6 is aligned with a shaft 8, there being between shafts 6 and 8 a mechanical clutch 9 of the synchro-self-shifting (S.S.S.) type. On shaft 8 is fixed a pinion 10 which meshes with a gear wheel 11 fixed on the output shaft 12, for example a propeller shaft, of the mechanism.

The shaft 7 is coupled to the impeller 13 of a hydraulic turbo coupling A and, via the casings 14 and 15, to the impeller 16 of a hydraulic turbo coupling B. The turbo couplings A and B are provided with slidable scoop tubes 17 and 18 respectively by which the degree of filling of the working circuits of the couplings can be varied.

The scoop tubes operate in scoop tube chambers 19 and 20 respectively that are in free communication with the associated working circuits, the scoop tubes 17 and 18 being connected to each other by a duct (not shown) through which working liquid may be transferred directly from one working circuit to the other, e.g., when manoeuvring ahead and astern. The said duct also has a connection through a valve to a sump to which liquid can be transferred, e.g., when emptying the working circuit of the coupling A while the working circuit of coupling B is full. Liquid is returned from the sump by a pump to the working circuits. Such an arrangement of turbo couplings is described in the specification of my co-pending patent application Serial No. 420,173, filed March 31, 1954, with reference to Fig. 6 thereof. The runner shaft 21 of turbo coupling A has a pinion 22 freely mounted on it. The runner shaft 23 of turbo coupling B is a sleeve shaft surrounding shaft 21, and has fixed on it an ahead pinion 24 meshing with gear wheel 11. The shaft 21 is capable of being clutched selectively to pinion 24 or to pinion 22 by means of synchro self-shifting clutches 24A and 24B. The pinion 22 meshes with a pinion 25 fixed on a countershaft 26 on which is also fixed an astern pinion 27 meshing with gear wheel 11. On shaft 21 is fixed a gear wheel 28 meshing with a gear wheel 29 which can be clutched when required to the shaft 26 by means of a friction plate clutch 30. The clutch 9 includes a control sleeve 37 which is free of torque loading when the clutch is in the engaged condition and can be selectively moved, with the aid of control mechanism including a fork (not shown) which engages a groove 41, either to a locking position in which the shaft 8 is bi-directionally locked to the shaft 6, or to an unlocked position in which the clutch 9 is uni-directionally free, i.e., it is capable of engaging and disengaging automatically according to the prevailing direction of relative rotation of shafts 6 and 8.

When clutch 9 is unlocked by control sleeve 37 it permits shaft 8 to rotate in the opposite direction to shaft 6, as is requisite when the astern drive is in operation.

The parts 24, 22, 25, 26 and 27 constitute reverse gearing whereby according to whether the shaft 21 is clutched to the ahead pinion 24 by S.S.S. clutch 24A or to the pinion 22 by S.S.S. clutch 24B, drive is transmitted from turbo coupling A to the output shaft 12 either via the ahead pinion 24, or via the astern pinion 27. The friction clutch 30 serves when it is engaged and coupling A is empty as a means of bringing the parts 21 and 22 of the reverse gearing into conditions of synchronism such as to effect change-over from ahead to astern drive. Hence when shaft 21 is clutched to pinion 22, the propeller shaft 12 will be driven astern by filling turbo coupling B, and will be driven ahead by filling turbo coupling A.

During operation in the ahead sense at full power, the clutch 9 is engaged, so that shaft 6 is clutched to shaft 8, and the clutch 24A is engaged whereby shaft 21 is clutched to the ahead pinion 24. The clutch 24B is disengaged. The scoop tubes 17 and 18 are adjusted to the positions in which the working circuits of both turbo couplings A and B are kept filled by the pump in the sump.

Under these conditions, drive is transmitted from the prime mover 1 to the output shaft 12 via two parallel paths, namely a mechanical first path which includes shafts 6 and 8, and a second path which includes the two turbo couplings A and B, both of which transmit power to the ahead pinion 24. The gearing is so arranged that when going ahead under full power the drive is shared substantially equally by the two paths, so that the slip loss in the said second path is only about one-half what it would be if the drive were transmitted solely via the said second path, i.e., via the two turbo couplings. Thus if the normal slip in the turbo couplings when operating at full speed with their working circuits filled is say 2%, when the total power is equally shared between the said first and second paths the slip loss in the second path will be only 1% of the power delivered by the prime mover 1. The desired arrangement of the gearing may for example be effected by making the gear wheel 5 suitably smaller than the gear wheel 4 so that the shaft 7 turns say 2% faster than the shaft 6; or alternatively, as shown, by making the ahead pinion 24 about 2% larger in pitch circle diameter than the pinion 10. Any other suitable arrangement may be adopted whereby the speed ratio as between pinion 3, shaft 7 and gear wheel 11 as compared with the speed ratio between pinion 3, shaft 6 and gear wheel 11 is such as to provide for the slip that is necessary when the second path is transmitting the desired proportion, in this case half, of the power.

In the case of ships wherein lengthy periods of cruising at reduced speed and power are a requirement the working circuits of both turbo couplings A and B are emptied to a sufficient extent, e.g., each 50% full, such that substantially the whole of the power is transmitted by the mechanical path, the slip losses at the low torque resulting from the reduced filling of the working circuit in the other power path being substantially zero.

Where astern drive is not required the reversing gearing may be omitted and a single turbo coupling of suitably increased dimensions may be used in place of the two turbo couplings A and B. Furthermore the clutch 9 is not then required, so that the two shafts 6 and 8 can then be replaced by a single shaft carrying the gear wheel 4 and pinion 10.

During ahead and astern manoeuvring with the arrangement of Fig. 1 the power is transmitted only via one or other of the turbo couplings A and B, the clutch 9 being disengaged. In order to change from ahead to astern drive the first step is to reduce the output of the turbine 1 to the minimum power for stable operation, whereupon, due to the slight difference in gear ratios of the drives through shafts 6 and 7 the power will be transmitted wholly through the turbo couplings, and the clutch 9 will be relieved of torque loading on the control sleeve 37, which is then disengaged. The next step, which may be concurrent with the first step, is to empty the working circuit of coupling B, and then to operate the reverse gear so that shaft 21 is uncoupled from ahead pinion 24 and is clutched to pinion 22, which is rotating in the opposite direction. To effect this clutching engagement the shaft 21 is brought to the appropriate direction of rotation and to synchronism with pinion 22 by engaging clutch 30 temporarily and bringing into action the synchronising gearing 28 and 29. The further step required to apply the torque of the turbine 1 to the propeller shaft 2 in the astern sense is to empty coupling B so as to disconnect the drive through pinion 24, and to transfer the contents of the working circuit of coupling B to fill coupling A, whereupon the torque is transmitted via the astern pinion 27.

The turbo couplings A and B are preferably of a type such that their torque transmission capacities cannot be reduced below a minimum value which imposes a sufficient minimum load on the turbine 1 during the change over. For this purpose the turbo couplings may be constructed so that their working circuits are incapable of being emptied together below a suitable minimum value, for example by the provision of stop means which determine the maximum degree of insertion of the scoop tubes 17 and 18 into the scoop tube chambers 19 and 20 at the same time.

The output shaft 21 of turbo coupling A being now clutch to the pinion 22 and the output sleeve shaft of coupling B being clutched to the ahead pinion 24, ahead and astern manoeuvring can be carried out by alternatively filling the working circuits of the turbo couplings B or A. The neutral condition of the system is achieved when both turbo couplings are partly filled so that the torque due to coupling A through pinion 24 is opposed by the torque due to coupling B through pinion 27, and hence no torque is transmitted to the propeller shaft 12. When manoeuvring is finished, and it is required to return to normal ahead running, the coupling B only is filled and the clutch 24B is unlocked, whereupon the coupling A is also filled and the clutch 24A is thereby engaged. Both turbo couplings are now coupled to the ahead pinion 24. In order to engage the clutch 9 the output of the turbine 1 is reduced momentarily, and in consequence of the difference in gear ratios relative rotation between shafts 6 and 8 ceases and clutch 9 moves into engagement, and is then locked in the engaged position. The output of the turbine 1 then is increased to the desired power for normal ahead working.

In the mechanism shown in Fig. 2, the general arrangement is the same as that already described with reference to Fig. 1, but a single hydraulic turbo coupling E is included in the second power path instead of the two turbo couplings A and B of Fig. 1, and the clutch 9 arranged in parallel with turbo coupling F connected to pinion 10 serves as an alternative means of clutching the input shaft 6 to the pinion 10, so as to establish a mechanical power path between pinion 3 and shaft 12. For ahead drive at full power, turbo coupling E has its working circuit filled, turbo coupling F has its working circuit empty, and the clutch 9 is engaged. The power is divided between the two paths and the total slip loss at full power is about 1%, assuming that the slip in turbo coupling E would be about 2% if it were transmitting the whole of the power delivered by the prime mover 1.

In this case the clutches 24A and 24B serve to clutch the output shaft 62 of coupling E alternatively to the ahead pinion 24, or to the pinion 22. For manoeuvring, the output shaft 62 is clutched to pinion 22, and ahead or reverse drive is obtained selectively by alternatively filling the working circuits of couplings F and E, clutch 9 being disengaged. In neutral drive, the working circuits of turbo couplings E and F are partly filled and hence the torques are in opposition and there is no drive transmitted to the propeller shaft 12. For ahead drive at full power, the output shaft 62 is clutched to the ahead pinion 24, clutch 9 is engaged, and the working circuits of turbo couplings E and F are full and empty respectively. It will be seen that the function of clutch 9 when engaged is to by-pass the turbo coupling F, the latter being capable of coming into operation only when clutch 9 is disengaged. If preferred therefore, the clutch 9 and turbo coupling F may be provided in entirely separate power paths which are alternatively effective to provide mechanical transmission through the clutch or hydraulic transmission through the turbo coupling F.

I claim:

1. A geared power transmission mechanism comprising first and second parallel power paths, said first power path including a mechanical clutch of the synchronous self-shifting type, and said second path including reversing gearing comprising a forward gear train and a reverse gear train, two controllable slip type hydraulic turbo couplings having their input elements coupled together, clutch means of the synchronous self-shifting type for coupling the output element of one of said turbo couplings selectively to said forward gear train or to said reverse gear train, and means coupling the output element of the other of said turbo couplings to said forward gear train, the ratios of the gearing of said mechanism being selected so that the input element of said turbo couplings rotates at a speed which is higher than the speed of the output elements of said turbo couplings when both couplings are coupled to said forward gear train, in the ratio which is necessary to ensure that said two couplings can transmit the desired proportion of the total power, when the remainder of the power is transmitted by said mechanical clutch.

2. A geared power transmission mechanism comprising a first power path comprising a controllable slip type hydraulic turbo coupling and a mechanical clutch of the synchronous self-shifting type operable to by-pass said coupling, and a second power path which includes reversing gearing comprising a forward gear train and a reverse gear train, a controllable slip type hydraulic turbo coupling and clutch means of the synchronous self-shifting type for coupling the output element of said turbo coupling selectively to said forward gear train or to said reverse gear train, the ratios of the gearing of said mechanism being selected so that when said mechanical clutch is engaged the speed ratio as between the input and output elements of said turbo coupling in said second path is such that said last-mentioned coupling can transmit the desired proportion of the total power while the remainder of the power is transmitted by said mechanical clutch.

3. A geared power transmission mechanism comprising first and second parallel power paths to an output element, said first path providing mechanical drive and including a mechanical clutch, and said second path including slip coupling means and reversing gearing, the ratios of the gearing being selected, so that with said clutch engaged and said reverse gearing set for driving said output element in the same direction by said two paths, the input shaft of said slip coupling means rotates at a suitably higher speed than the output shaft of said slip coupling means to conform with the slip that is necessary in said slip coupling means when transmitting the desired proportion of the power.

4. A geared power transmission mechanism comprising first and second parallel power paths to an output element, wherein said first path provides mechanical drive and includes a mechanical clutch that is engageable for providing forward drive of said output element via said first path, and said second path includes reverse gearing comprising a forward gear train and a reverse gear train, and two controllable slip type couplings having their input shafts coupled together, means drivably connecting the output shaft of one of said slip couplings to said output element of the system via said forward gear train, and clutch means operable to drivably connect the output element of the other of said couplings to said output element selectively via said forward gear train or via said reverse gear train, the ratios of the gearing of said mechanism being selected so that when said mechanical clutch is engaged and the output elements of both said couplings are drivably connected to said forward gear train the input shafts of said slip couplings rotate at a suitably higher speed than their output shafts to conform with the slip that is necessary in said couplings when transmitting the desired proportion of the power.

5. A geared power transmission mechanism comprising first and second parallel power paths to an output element, wherein said first path provides mechanical drive and includes a mechanical clutch that is engageable for providing forward drive of said output element via said first path, and said second path includes reverse gearing comprising a forward gear train and a reverse gear train, and two controllable slip type couplings having their input shafts coupled together, means drivably connecting the output shaft of one of said slip couplings to said output element of the system via said forward gear train, and clutch means of the synchronous self-shifting type operable to drivably connect the output element of the other of said couplings to said output element selectively via said forward gear train or via said reverse gear train, the ratios of the gearing of said mechanism being selected so that when said mechanical clutch is engaged and the output elements of both said couplings are drivably connected to said forward gear train the input shafts of said slip couplings rotate at a suitably higher speed than their output shafts to conform with the slip that is necessary in said couplings when transmitting the desired proportion of the power.

6. A geared power transmission mechanism comprising first, second and third parallel power paths to an output element, wherein said first path providing mechanical drive and including a mechanical clutch that is engageable for providing forward drive of said output element via said first path, said second path includes reverse gearing comprising a forward gear train and a reverse gear train, said second path also including a controllable slip coupling and means for drivably connecting the output shaft of said slip coupling to said output element selectively via said forward gear train or said reverse gear train, the ratios of the gearing of said mechanism being selected so that when said mechanical clutch is engaged and said reverse gearing is set to provide forward drive via said second path, the input shaft of said slip coupling rotates at a suitably higher speed than the output shaft of said coupling to conform with the slip that is necessary in said slip coupling when transmitting the desired proportion of the power and said third power path including a controllable slip coupling.

7. A geared power transmission element comprising first and second parallel power paths to the output element of the system, said first path including a controllable slip type coupling and a mechanical clutch engageable to by-pass said slip coupling and provide mechanical forward drive of said output element, and said second path including reverse gearing comprising forward and reverse gear trains, said second path also including a controllable slip coupling and means for drivably connecting the output shaft of said last-mentioned slip coupling to said output element selectively via said forward gear train or said reverse gear train, the ratios of the gearing of the mechanism being selected so that when said mechanical clutch is engaged and said reverse gearing is set for forward drive of said output element via said second path the input shaft of the slip coupling in said second path rotates at a suitably higher speed than the output shaft thereof to conform with the slip that is necessary in said last-mentioned slip coupling when transmitting the desired proportion of the power.

8. A geared power transmission mechanism, comprising, first and second parallel power paths each provided with a gear individual thereto, a driving member having a driving toothed member in driving engagement with both of said gears, said first path providing mechanical drive and said second path including a slip coupling having input and output shafts, and a clutch in said first path whereby power is transmitted simultaneously through said two paths in parallel when said clutch is engaged and power is transmitted only through said path containing the slip coupling when said clutch is disengaged, the ratios of the gearing being arranged so that the input shaft of said slip coupling rotates at a suitably higher speed than the output shaft of said coupling to conform with the slip that is necessary in said coupling when transmitting the desired proportion of the power transmitted by both of said paths simultaneously when said clutch is engaged.

9. A geared power transmission mechanism comprising first and second parallel simultaneously operable power paths each of which in the operation of the mechanism shares in the transmission of the power, said first path providing mechanical drive and said second path including a slip coupling, the ratios of the gearing being arranged so that with the system in operation the input shaft of said coupling necessarily rotates at a speed that is higher than the output shaft of the coupling in a ratio that is constant irrespective of the power transmitting capability of the coupling, said first path including a mechanical clutch of the synchronous self-shifting type.

References Cited in the file of this patent

UNITED STATES PATENTS

| | | |
|---|---|---|
| 2,049,673 | Starr | Aug. 4, 1936 |
| 2,213,342 | Gossler | Sept. 3, 1940 |
| 2,245,017 | Sinclair | June 10, 1941 |
| 2,492,456 | Becker | Dec. 27, 1949 |
| 2,693,120 | Maybach | Nov. 2, 1954 |
| 2,736,407 | Smirl | Feb. 28, 1956 |
| 2,749,773 | Simpson | June 12, 1956 |